(12) United States Patent
Bunker

(10) Patent No.: US 6,506,022 B2
(45) Date of Patent: Jan. 14, 2003

(54) TURBINE BLADE HAVING A COOLED TIP SHROUD

(75) Inventor: Ronald Scott Bunker, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/681,553

(22) Filed: Apr. 27, 2001

(65) Prior Publication Data

US 2002/0159889 A1 Oct. 31, 2002

(51) Int. Cl.[7] .................................................. F01D 5/18
(52) U.S. Cl. ..................................... 416/97 R; 416/191
(58) Field of Search ............................... 416/97 R, 189, 416/191; 415/115

(56) References Cited

U.S. PATENT DOCUMENTS

| | | | |
|---|---|---|---|
| 5,460,486 A | 10/1995 | Evans et al. | 416/97 R |
| 5,482,435 A | 1/1996 | Dorris et al. | 416/97 R |
| 5,785,496 A | 7/1998 | Tomita | 416/97 R |
| 5,889,254 A * | 3/1999 | Jones | 219/121.63 |
| 5,980,209 A * | 11/1999 | Barry et al. | 416/223 A |
| 6,086,328 A * | 7/2000 | Lee | 416/97 R |

* cited by examiner

Primary Examiner—Edward K. Look
Assistant Examiner—Kimya N. McCoy
(74) Attorney, Agent, or Firm—Patrick K. Patnode; Christian G. Cabou

(57) ABSTRACT

A turbine blade having a cooled shroud comprises a blade attachment portion and a radially extended turbine airfoil integral with the blade attachment portion. The turbine airfoil has a plurality of cooling passages. A tip shroud is affixed to a top portion of the airfoil, the tip shroud having a plurality of circumferential cooling channels disposed substantially parallel to the rotation of the airfoil. Each circumferential cooling channel is in communication with a respective cooling passage and at least one exit port is in communication with at least one of the circumferential cooling channels.

22 Claims, 4 Drawing Sheets

TURBINE BLADE HAVING A COOLED TIP SHROUD

BACKGROUND OF INVENTION

The present invention relates to turbine blades. More particularly, the present invention relates to a turbine blade having a cooled tip shroud.

A turbine assembly, such as those used in aircraft, and power generation, typically generates rotating shaft power by expanding hot compressed gas produced by combustion of a fuel. Power generation takes place in the turbine section of the turbine assembly. The turbine assembly employs a number of rotating blades that are affixed to the rotating shaft and include an airfoil portion.

The efficiency of the turbine assembly is limited in part by "spillover:" the escape of hot combustion gases through the clearance gap between the turbine blade and the wall of the turbine assembly, which is commonly referred to as the turbine shroud. To reduce spillover, it is a common practice in the art to provide a tip shroud on the end of the airfoil opposite the end attached to the rotating shaft. The tip shroud includes a shelf and, optionally, a blade tooth that reduces spillover by decreasing the size of the clearance gap and interrupting the hot gas path around the end of the turbine blade.

Tip shrouds are subject to creep damage due to the combination of high temperature and centrifugally induced bending stresses. The creep is usually manifested by the formation of "dog ears" along unsupported edges of the shelf formed by the tip shroud. "Dog ears" as used herein, means the folding or degrading of the metal edges of the shelf formed by the tip shroud. Because it has been generally found that reinforcing the shelf simply transfers the stress from tip shroud to the root of the airfoil, the approach to reducing creep in this region of the turbine blade has been to "scallop" i.e., remove unsupported portions of the shelf. Scalloping, however, leads to increased hot gas path leakage past the turbine blade. If the tip shroud and shelf could be adequately cooled, the need to scallop the shelf could be substantially reduced. Consequently spillover would also be reduced and turbine efficiency could be improved.

The turbine blade designs that are currently available do not provide adequate cooling to allow the use of a tip shroud having a sufficiently large unsupported shelf that would decrease spillover. Therefore what is needed is a turbine blade that provides sufficient cooling to the tip shroud and shelf. What is also needed is a cooled tip shroud having a shelf that is sufficiently large to prevent spillover.

SUMMARY OF INVENTION

A turbine blade having a cooled shroud comprises a blade attachment portion and a radially extended turbine airfoil integral with the blade attachment portion. The turbine airfoil has a plurality of cooling passages. A tip shroud is affixed to a top portion of the airfoil, the tip shroud having a plurality of circumferential cooling channels disposed substantially parallel to the rotation of the airfoil. Each circumferential cooling channel is in communication with a respective cooling passage and at least one exit port is in communication with at least one of the circumferential cooling channels.

DETAILED DESCRIPTION

Figure 1:
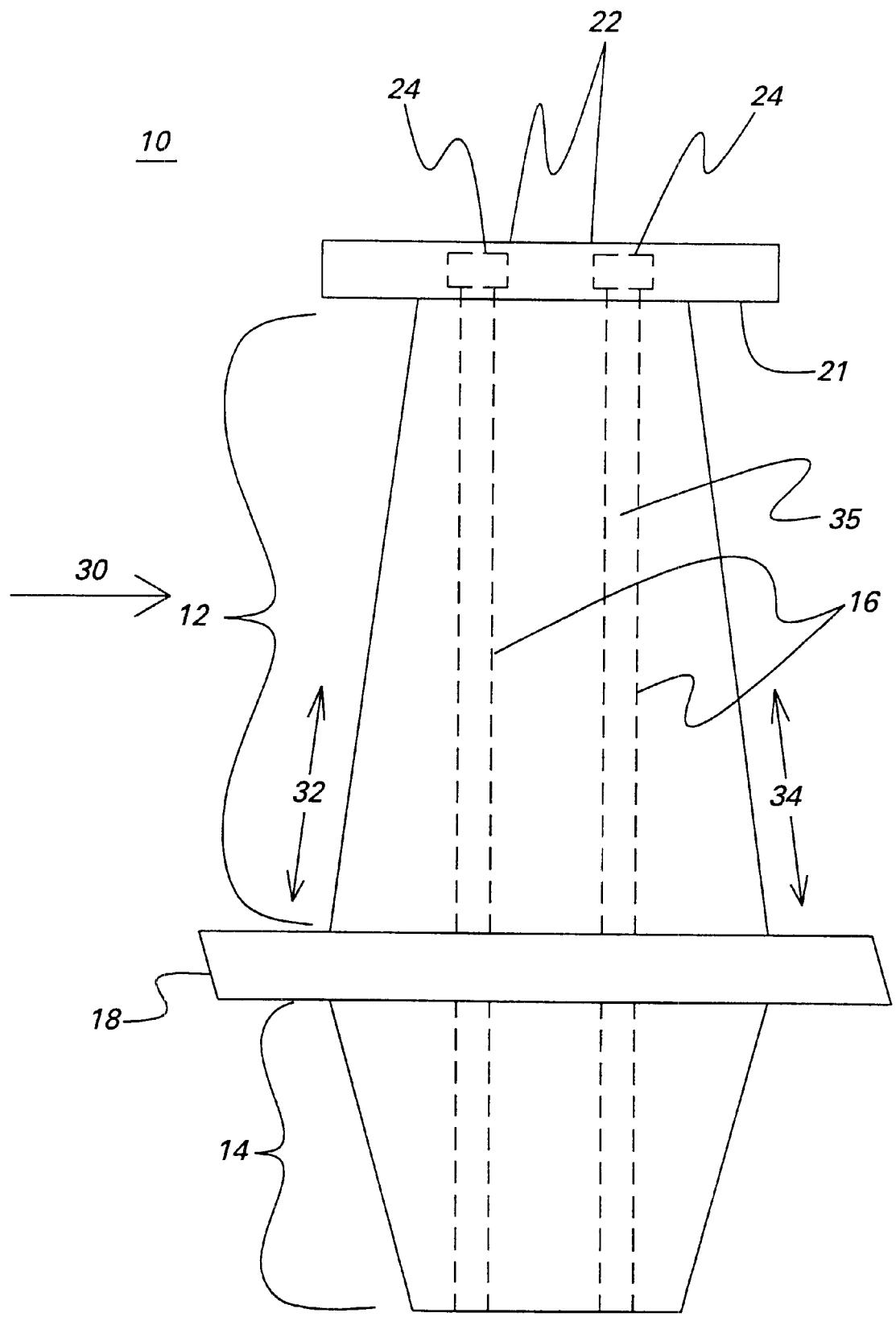
FIG. 1 is a side view of a turbine blade of the present invention.

In the following description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto. A side view of a turbine blade 10 of the present invention is shown in FIG. 1. The turbine blade 10 is typically located in the high-pressure stage of a turbine assembly (not shown). The turbine blade 10 is integrally cast, typically from one of a nickel-based superalloy, such as, but not limited to, Rene N5 and cobalt-based alloys. A blade attachment portion 14 allows the turbine blade 10 to be attached to a turbine shaft (not shown) such that the turbine blade 10 extends radially outward from the turbine shaft. The attachment portion 14 may have either a dovetail or shank form or may include both. A blade platform 18 defines the inner radius of the hot gas flow path, and also provides a barrier between the hot gas and the inboard secondary flow system. Additionally, blade platform 18 provides additional support for both the attachment portion and airfoil of the turbine blade 10.

Airfoil 12 portion of turbine blade 10 extends from the blade platform 18 into the hot gas path 30 of the turbine assembly. Airfoil 12 has an aerodynamic profile to generate aerodynamic lift, with a leading edge 32 generally oriented upstream toward the combustion section of the turbine assembly and trailing edge 34 generally oriented downstream toward the exhaust section of the turbine assembly. The interaction of the combustion product gases in the hot gas path 30 with the airfoil 12 causes the airfoil 12—and thus the turbine blade 10—to travel a circumferential path 36 (FIG. 2, FIG. 3) about the longitudinal axis of the turbine shaft.

A plurality of cooling passages 16 extend from the blade attachment portion 14 through the interior of the airfoil 12 to an end of the airfoil 12 opposite the point where the airfoil 12 meets the platform 18. The cooling passages 16 provide a cooling medium to the portions of the turbine blade 10 that are exposed to high temperatures within the hot gas path 30. In one embodiment, the cooling passages 16 may be substantially straight in, extending radially through the airfoil 12. In another embodiment, all or some of the cooling passages 16 may include turbulators. In yet another embodiment, a portion of each or some of the cooling passages 16 may be serpentine in shape. In addition, all or some of the cooling passages 16 may further include an end portion 35 that is deflected at an angle ranging from about 0 to about 30 degrees. Typically, the number of radial cooling passages 16 ranges from about 1 to about 10, with each of the cooling passages 16 having a diameter in the range between about 0.080 inch to about 0.3 inch.

Figure 2:
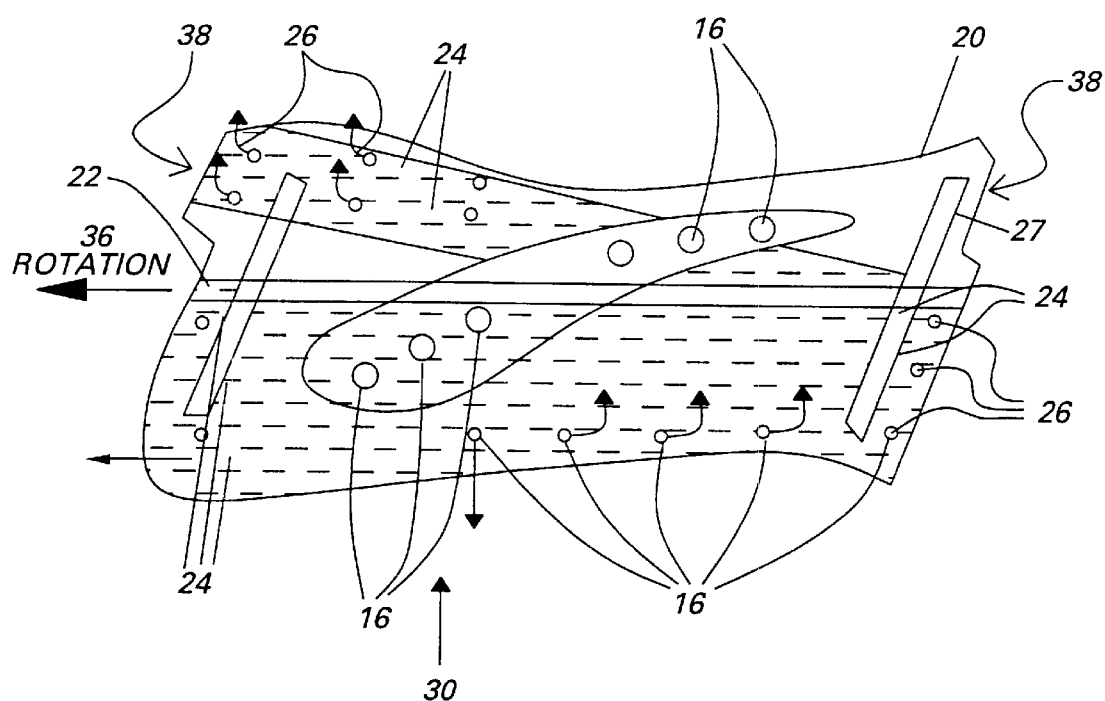
FIG. 2 is a top view of an airfoil and tip shroud of the present invention.
Figure 3:
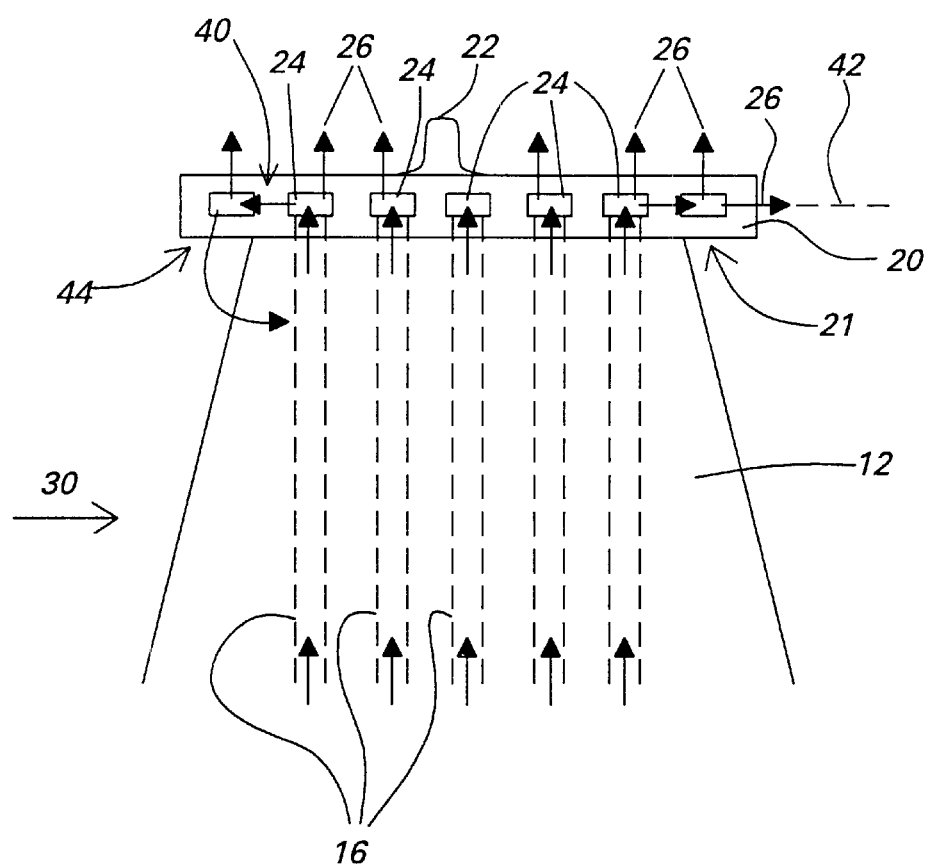
FIG. 3 is a side view of the tip shroud of the present invention.

FIGS. 2 and 3 are a top view and side cross-sectional view, respectively, of the turbine blade 10 of the present invention, showing the tip shroud 20. As seen in FIG. 1, the tip shroud 20 is affixed to the airfoil 12 at the end of the airfoil opposite the point where the airfoil 12 meets the platform 18. The tip shroud 20 extends beyond the edges of the airfoil to form an overhanging shelf 21. A plurality of circumferential cooling channels 24, oriented substantially parallel to the circumferential path 36 traveled by the airfoil 12 and turbine blade 10, are located within the tip shroud 20. Each of the circumferential cooling channels 24 is in communication with at least one cooling channel 16, thus permitting cooling medium to pass from the cooling channels 16 into the tip shroud 20, thereby cooling the tip shroud 20. Adjacent circumferential cooling channels 24 may be interconnected by at least one lateral passage 27.

Each of the circumferential cooling channels 24 is in communication with at least one exit port 26. Each exit port 26 connects at least one of the circumferential cooling channels 24 to an outer surface of the tip shroud 20 to permit bleed cooling of the outer surfaces of the tip shroud 20. An exit port 26 may be angled in a range between about 15 degrees to about 90 degrees with respect to a longitudinal center line 42 and may be disposed so as to direct the cooling medium onto and over a specific surface region of the tip shroud 20. Such surface regions include, but are not limited to an interface 38 between adjacent tip shrouds 20, a top surface 40 of the tip shroud, or a bottom surface 44 of the tip shroud defining the outer radius of the hot gas flow path.

Figure 4:
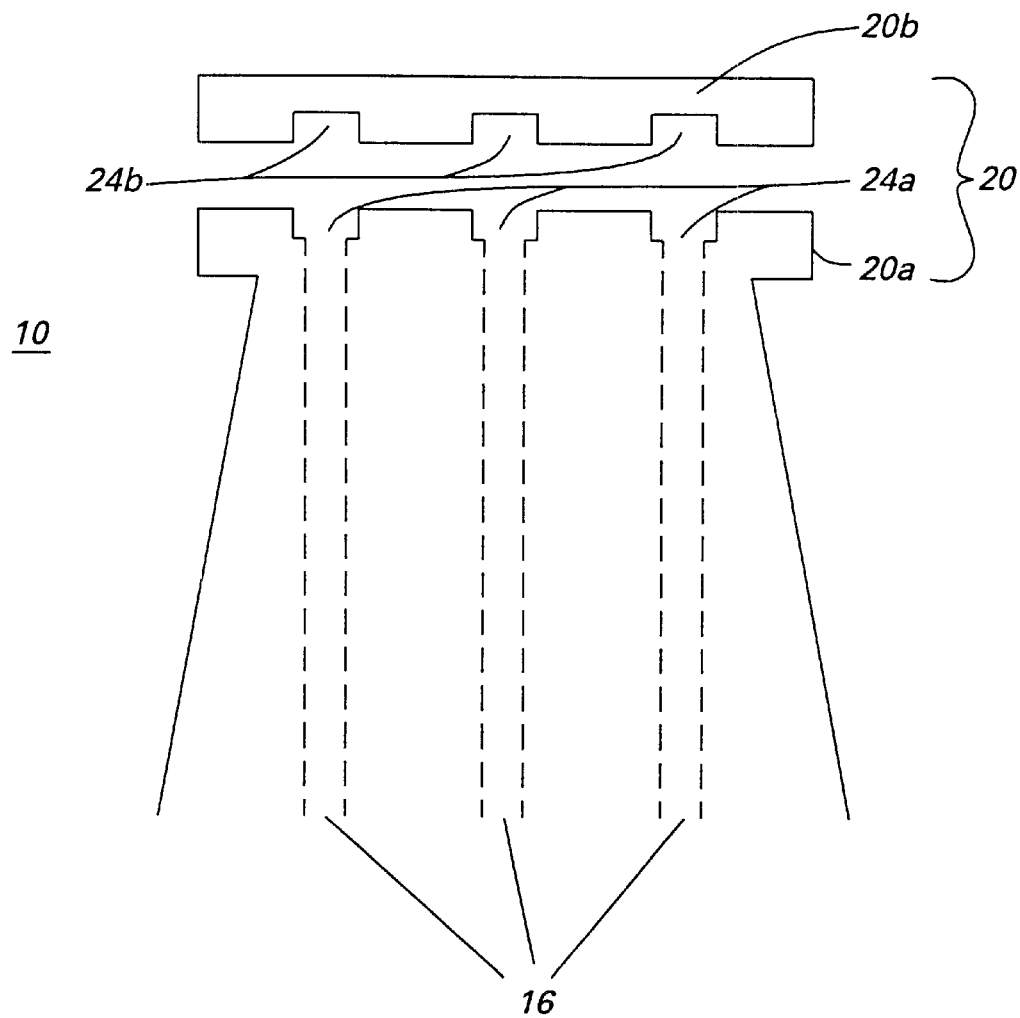
FIG. 4 is a side view showing a method of forming the shroud tip of the present invention.

The tip shroud 20 may be integrally cast along with the entire turbine blade 10. Circumferential cooling channels 24 are drilled through the tip shroud 20 so as to intersect the cooling channels 16 extending through the airfoil 12. A second method of forming the tip shroud 20 is shown in FIG. 4. In FIG. 4, a lower half 20a of the tip shroud 20 is either integrally cast with the remainder of the turbine blade 10 or cast separately and later affixed to the turbine blade 10. Lower half 20a includes lower recessed areas 24a that form the bottom halves of circumferential cooling channels 24. Communication between lower recessed areas 24a and cooling channels 16 is established either through the casting process or by machining openings between lower recessed areas 24a and cooling channels 16. An upper half 20b of tip shroud 20 is also cast. Upper half 20b includes upper recessed areas 24b, which form the top halves of circumferential cooling channels 24. Upper recessed areas 24b and lower recessed areas 24a may be either cast or machined into upper half 20b and lower half 24a, respectively. Upper half 20b is then joined to lower half 20a by any means known in the art, such as welding, to form tip shroud 20. Exit ports 26 are then machined into the shroud tip 20. Alternatives include having a flat lower half 20a with the channels disposed entirely in upper half 20b, or vice-versa.

Turbine efficiency is reduced by "spillover:" the escape of hot combustion gases through the clearance gap between the turbine blade 10 and the turbine wall, commonly referred to as the turbine shroud (not shown). To minimize spillover and increase turbine efficiency, the turbine blade 10 may also include at least one blade tooth 22 disposed on the top surface 40 of the tip shroud 20. The blade tooth 22 is a ridge, usually formed from the same material as the turbine blade 10, that extends radially outward from the top surface 40 of the turbine shroud 22. The blade tooth 22 is oriented parallel to the circumferential path 36 traveled by the airfoil 12 and turbine blade 10, and provides an additional barrier to the passage of combustion gases through the clearance gap. The blade tooth 22 may either be integrally cast with the remainder of the turbine blade 10 or formed separately and later joined to the top surface 40 of the tip shroud 20 by conventional joining means, such as welding. In one embodiment, turbine blade 10 may include more than one blade tooth 22. To more effectively prevent spillover, the blade tooth 22 may also be angled up to 45 degrees toward the upstream direction. In addition, the gas path around through the clearance gap may be further constricted by recessing a portion of the turbine shroud to accommodate the tip shroud 20 and blade tooth 22. In low pressure stages of the turbine system, spillover may be further restricted by forming a portion of the turbine shroud adjacent to the blade tooth 22 from a material having a honeycomb structure that allows the blade tooth 22 to seat itself in the turbine shroud.

Unlike turbine blades currently found in the art, the turbine blade 10 of the present invention provides adequate cooling to those parts of the tip shroud 20 that are most susceptible to high temperature creep and the formation of "dog ears" along unsupported edges of the shelf 21 formed by the tip shroud 20. In the prior-art, the inability to provide adequate cooling to the tip shroud and shelf has led others to scallop the shelf i.e., remove unsupported portions of the shelf. Scalloping the shelf, however, leads to increased hot gas path leakage past the turbine blade. In contrast to the prior-art solution, the present invention, by providing more efficient distribution of the cooling medium along the critical surfaces of the tip shroud 20, reduces the need to scallop the shelf portion 21 of the tip shroud 20.

While various embodiments are described herein, it will be apparent from the specification that various combinations of elements, variations, or improvements thereon may be made by those skilled in the art, and are thus within the scope of the invention.

What is claimed is:

1. A turbine blade having a cooled shroud comprising:
   a blade attachment portion;
   a radially extended turbine airfoil integral with said blade attachment portion, said turbine airfoil having a plurality of cooling passages;
   a tip shroud affixed to a top portion of said airfoil, said tip shroud having a plurality of circumferential cooling channels disposed substantially parallel to the rotation of said airfoil wherein each circumferential cooling channel is in communication with a respective cooling passage; and
   at least one exit port in communication with at least one of said circumferential cooling channels;
   wherein said tip shroud further comprises at least one lateral passage connecting adjacent circumferential cooling channels.

2. A turbine blade in accordance with claim 1, further comprising at least one blade tooth disposed on a top surface of said tip cap.

3. A turbine blade in accordance with claim 2, wherein said blade tooth is leaned at an angle in the range between about 1 degrees and 45 degrees with respect to said tip shroud.

4. A turbine blade in accordance with claim 1, wherein said turbine airfoil comprises between about 1 to about 10 cooling passages.

5. A turbine blade in accordance with claim 1, wherein said turbine airfoil cooling passages have a diameter in the range between 0.080 in. to about 0.3 inches.

6. A turbine blade in accordance with claim 1, wherein said cooling passages are radial cooling passages.

7. A turbine blade in accordance with claim 1, wherein said cooling passages comprise a deflected end portion having an angle of deflection in the range between about 0 degrees to about 30 degrees, with respect to a longitudinal centerline through said cooling passages.

8. A turbine blade in accordance with claim 1, wherein said tip shroud is made from two pieces welded together to generate said circumferential cooling passages.

9. A turbine blade in accordance with claim 1, wherein said tip shroud is cast and said circumferential cooling passages are drilled.

10. A turbine blade in accordance with claim 1, wherein said exit ports are angled with respect to a longitudinal center line through said cooling passages in the range between about 15 degrees to about 90 degrees.

11. A blade in accordance with claim 1, wherein said exit ports are disposed so as to direct cooling air at an interface between adjacent tip shrouds.

12. A turbine blade in accordance with claim 1, wherein said exit ports are disposed within a top surface of said tip shroud.

13. A turbine blade in accordance with claim 1, wherein said exit ports are disposed on a bottom surface of said tip shroud at said hot gas interchange.

14. A turbine blade in accordance with claim 1, wherein said turbine blade is made from at least one of a nickel-based alloy or a cobalt-based alloy.

15. A tip shroud for disposal upon a top portion of an airfoil having cooling passages, said tip shroud comprising:

a plurality of circumferential cooling channels disposed substantially parallel to the rotation of said airfoil wherein each circumferential cooling channel is in communication with a respective cooling passage of said airfoil; and at least one exit port in communication with at least one of said circumferential cooling channels;

wherein said tip shroud further comprises at least one lateral passage connecting adjacent circumferential cooling channels.

16. A tip shroud in accordance with claim 15, wherein said tip shroud is made from two pieces welded together to generate said circumferential cooling passages.

17. A tip shroud in accordance with claim 15, wherein said tip shroud is cast and said circumferential cooling passages are drilled.

18. A tip shroud in accordance with claim 15, wherein said exit ports are angled with respect to a longitudinal center line in the range between about 15 degrees to about 90 degrees.

19. A tip shroud in accordance with claim 15, wherein said exit ports are disposed so as to direct cooling air at an interface between adjacent tip shrouds.

20. A tip shroud in accordance with claim 15, wherein said exit ports are disposed within a top surface of said tip shroud.

21. A tip shroud in accordance with claim 15, wherein said exit ports are disposed on a bottom surface of said tip shroud at said hot gas interchange.

22. A tip shroud in accordance with claim 15, wherein said tip shroud is made from at least one of a nickel-based alloy or a cobalt-based alloy.

* * * * *